(No Model.)

C. C. SHELBY.
BELL CORD COUPLING.

No. 349,061. Patented Sept. 14, 1886.

Witnesses.
Chas. R. Burr.
Thomas Durant.

Inventor.
Christopher C. Shelby
by Church & Church
his Attorneys.

UNITED STATES PATENT OFFICE.

CHRISTOPHER C. SHELBY, OF PATERSON, NEW JERSEY.

BELL-CORD COUPLING.

SPECIFICATION forming part of Letters Patent No. 349,061, dated September 14, 1886.

Application filed June 26, 1886. Serial No. 206,375. (No model.)

*To all whom it may concern:*

Be it known that I, CHRISTOPHER C. SHELBY, of Paterson, in the county of Passaic and State of New Jersey, have invented certain new and useful Improvements in Bell-Cord Couplings; and I do hereby declare the following to be a full, clear, and exact description of the same, reference being had to the accompanying drawings, forming a part of this specification, and to the figures and letters of reference marked thereon.

The couplings that are usually employed on the bell-cords of railway-trains are defective, not so much on account of their liability of becoming uncoupled from each other as on account of their liability to become detached from the cords or ropes to which they are applied.

It is therefore the object of my present invention to provide a coupling adapted to be fastened to the cord or rope in such a strong and substantial manner as to render it impossible to pull the rope from it or to work the rope loose by any amount or kind of strain brought to bear upon it.

To this end it consists of a coupling of malleable metal, preferably a malleable-iron casting, provided with a hook for engaging the hook of a corresponding coupling, and having a semi-tubular shank provided with one or more interior-projecting pins adapted to pass through the cord or rope, and to co-operate with recesses or notches in the edges of said semi-tubular shank when the said edges are brought together by the compression of said shank upon the rope, or to be headed down or riveted, so as to complete the connection, all substantially as will be hereinafter more fully pointed out and claimed.

Figure 1:
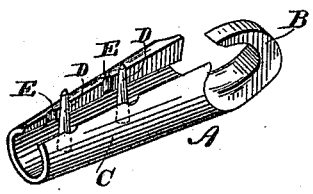
Figure 2:
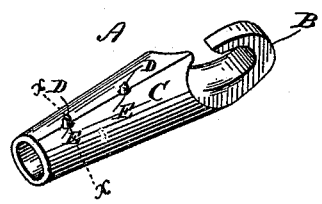
Figure 3:
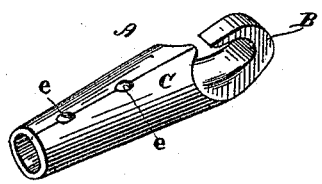
Figure 4:
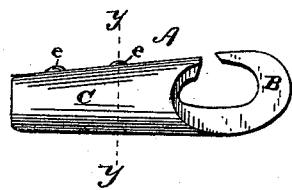
Figures 5, 6:
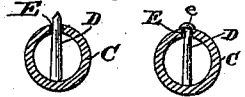
Figure 7:
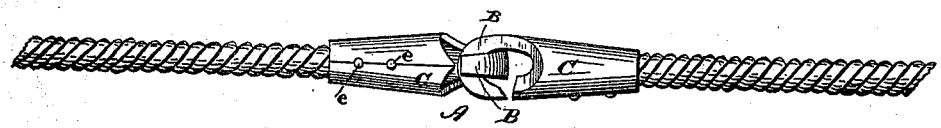

Referring to the accompanying drawings, Figure 1 is a perspective view of my improved coupling as it appears before attachment to the cord or rope; Fig. 2, a similar view showing the coupling after the rope has been impaled upon the pins or prongs and the shank compressed upon the rope; Fig. 3, a like view of the coupling as it appears after the ends of the pins or prongs have been headed down. Fig. 4 is a side elevation of the coupling; Fig. 5, a cross-sectional view taken on the line *x x*, Fig. 2; Fig. 6, a cross-section view taken on the line *y y*, Fig. 4; Fig. 7, a view of two connected couplings constructed in accordance with my invention.

Similar letters of reference in the several figures indicate the same parts.

The letter A designates the malleable casting of which the coupling is composed; B, the hook thereof; C, the semi-tubular shank having the pins or prongs D D formed upon its interior and projecting through the longitudinal opening in its side, as shown in Fig. 1, and having the recesses or notches E E, for accommodating the upper portion of the pins or prongs when the shank is compressed about the rope; and *e* the heads formed on the said pins or prongs by upsetting the ends of the latter, as shown in Figs. 3, 4, and 6.

To attach the rope it is only necessary to first force it laterally into the slot or opening in the side of the semi-tubular shank, so that the pins or prongs D D will pass transversely through it, and then, by a hammer, press, or otherwise, compress the shank till the edges along the slot meet, as shown in Fig. 2, leaving the ends of the pins or prongs projecting through the recesses or notches E, as shown in said last-mentioned figure and in Fig. 5. This done, the connection is completed by upsetting or riveting the projecting ends of the pins, as shown in Figs. 3 and 6. The pins or prongs, it will be observed, serve to positively hold the rope within the shank, and, being secured firmly at both ends, cannot possibly be disturbed by any amount of pull exerted upon the rope.

While I have described my coupling as applied particularly to bell-ropes, it is evident that it can also be employed to advantage wherever it is desired to join two ropes or cords on the opposite ends of a rope, cord, or belt.

Having thus described my invention, what I claim as new is—

The herein-described coupling for cords or ropes, made of malleable metal and formed with the hook, the compressible semi-tubular shank having the pins or prongs and the recesses or notches, said pins being adapted to pass through the recesses or notches on the opposite side of the tubular portion from that to which they are attached and be upset, the device being adapted for connection to a rope or cord, in the manner set forth.

CHRISTOPHER C. SHELBY.

Witnesses:
FRANCK D. JOHNS,
THOMAS DURANT.